US009670844B1

(12) United States Patent
Wilkins, Jr. et al.

(10) Patent No.: US 9,670,844 B1
(45) Date of Patent: Jun. 6, 2017

(54) JET ENGINE ATTACHMENT DEVICE

(71) Applicant: WRC JET INNOVATIONS, L.P., Navasota, TX (US)

(72) Inventors: Joe Sam Wilkins, Jr., Navasota, TX (US); Donald Walter Platt, Melbourne, FL (US); Jonathan L. Rankin, Plantersville, TX (US)

(73) Assignee: WRC Jet Innovations, L.P., Navasota, TX (US)

( * ) Notice: Subject to any disclaimer, the term of this patent is extended or adjusted under 35 U.S.C. 154(b) by 747 days.

(21) Appl. No.: 13/844,440

(22) Filed: Mar. 15, 2013

Related U.S. Application Data

(63) Continuation-in-part of application No. 13/679,868, filed on Nov. 16, 2012, now abandoned.

(60) Provisional application No. 61/629,441, filed on Nov. 18, 2011.

(51) Int. Cl.
| | |
|---|---|
| *F02C 1/00* | (2006.01) |
| *F02C 7/141* | (2006.01) |
| *F02C 7/16* | (2006.01) |
| *F02K 1/82* | (2006.01) |

(52) U.S. Cl.
CPC ............... *F02C 7/141* (2013.01); *F02C 7/16* (2013.01); *F02K 1/822* (2013.01); *F05D 2220/323* (2013.01); *F05D 2270/051* (2013.01)

(58) Field of Classification Search
CPC ..... F02K 9/64; F02K 3/10; F02K 7/10; F02K 1/36; F02K 1/82; F02K 1/386; F02K 1/822; F02K 1/825; F02C 3/30; F02C 3/305; F02C 7/22; F02C 7/228042; F02C 7/057; F02C 7/1435; F02C 9/20; F02C 9/263; F23R 3/00; F23R 3/002; F23R 3/18; F23R 3/20; F23R 3/22; F23R 3/26; F23R 3/60; F04D 27/0246; Y02T 50/671; Y02T 50/675; Y02E 20/14; Y02E 20/16; F01K 21/047; B64C 29/005; B64C 29/0025; B64D 33/04; B64D 2033/045; B64G 1/26; C06D 6/06; C06B 43/00; C06B 29/04; C06B 31/00; C06B 35/00; F23D 2209/20

See application file for complete search history.

(56) References Cited

U.S. PATENT DOCUMENTS

| | | | |
|---|---|---|---|
| 2,689,452 A | 9/1954 | Jordan | 60/35.6 |
| 2,862,566 A | 12/1958 | Fletcher | 170/135.4 |
| 2,929,201 A | 3/1960 | Lindsey | 60/35.6 |
| 3,016,704 A | 1/1962 | Duncan et al. | 60/39.72 |
| 3,591,969 A | 7/1971 | Brereton et al. | 60/259 |

(Continued)

OTHER PUBLICATIONS

U.S. Appl. No. 13/679,868, Non-Final Office Action, dated Jun. 18, 2015.

*Primary Examiner* — Gerald L Sung
(74) *Attorney, Agent, or Firm* — Winston & Strawn LLP

(57) ABSTRACT

The principles and embodiments of the present invention relate to a device designed for integration with the exhaust pipe of a jet engine, wherein the device may be a separate component designed to attach to an existing jet engine exhaust pipe, or it may be an integral component of the exhaust pipe installed during the manufacture of the engine assembly. In an embodiment of the invention, the device supplies both a cooling liquid and an oxygen supply to the jet engine to increase its thrust and fuel efficiency, and reduce the temperature and the volume of sound produced by the engine.

16 Claims, 10 Drawing Sheets

(56) References Cited

U.S. PATENT DOCUMENTS

| | | | | |
|---|---|---|---|---|
| 3,812,672 | A | | 5/1974 | Escher ............................ 60/244 |
| 5,110,502 | A | | 5/1992 | Singh ............................ 252/319 |
| 5,269,132 | A | * | 12/1993 | Loucks ................... F02K 1/825 |
| | | | | 239/127.1 |
| 5,400,589 | A | | 3/1995 | Mahias et al. |
| 6,644,015 | B2 | | 11/2003 | McKinney ...................... 60/205 |
| 6,895,756 | B2 | | 5/2005 | Schmotolocha et al. ....... 60/761 |
| 7,013,636 | B2 | | 3/2006 | Iya et al. |
| 2005/0138932 | A1 | | 6/2005 | Perricone ........................ 60/772 |
| 2008/0087434 | A1 | | 4/2008 | Wilen et al. ................... 166/312 |
| 2009/0288390 | A1 | | 11/2009 | Pavia et al. ..................... 60/267 |
| 2009/0293448 | A1 | | 12/2009 | Grote et al. .................... 60/204 |
| 2009/0317249 | A1 | | 12/2009 | Brook ............................... 416/1 |

\* cited by examiner

| Test | A ambient temp | B engine temp | C Steel rod temp | D % change | E LN PSI | F LN | G inside nozzles | H outside nozzles | I steel rod distance | J |
|---|---|---|---|---|---|---|---|---|---|---|
| 1 | 68 F | 530 F | 267 F | | 225 | ? | ? | ? | 18 in | 4 ball nozzles |
| | | | 214 F | -20% | | on | on | ? | | inside only on |
| 2 | 68 F | | 208 steady dropped to | -22% | 200 | | | | | 4 ball nozzles inside & out both on |
| 3 | 67 F | | 151 F | -43% | 200 | on | on | on | 18 in | only 3 nozzles opening |
| | | | | | | on | ? | on | 18 in | 4 swirl nozzles- out only |

Figure 9

| | | A | B | C | D | E | F | G | H | I | J |
|---|---|---|---|---|---|---|---|---|---|---|---|
| | | ambient temp | engine temp | Steel rod temp | % change | LN PSI | LN | inside nozzles | outside nozzles | steel rod distance | |
| Test 4 | 2:55 | 77 F | | | | | | | | | |
| | 3:00 | | 530 F 102.5 %RPM | 290 F | | 300 | ? | ? | ? | 18 in | 4 cone nozzles- outside only AMBIENT OR BELOW |
| | 3:06 | 77 F | same | 74 F | -75% | | on | ? | on | | |
| 5 | 4:00 | 78 F | same | 290 F | | 250 | ? | ? | ? | | |
| | 4:03 | | | 290 F | | | on | ? | on | 18 in | 4 full cone nozzles- outside only AMBIENT or BELOW |
| | 4:06 | | | 51 F | -82% | | on | ? | on | | |

Figure 10

JET ENGINE ATTACHMENT DEVICE

FIELD OF THE INVENTION

The principles of the present invention relates to systems and methods of reducing temperature signatures, reducing noise levels, and increasing the fuel efficiency of jet engine exhaust.

BACKGROUND OF THE INVENTION

A jet engine produces a fast moving exhaust to produce thrust. Typically, a compressor pulls ambient air into a combustion chamber where it is mixed with a fuel to generate a hot exhaust gas. This exhaust gas then exits the engine and by Newton's law of equal and opposite reaction produces a forward thrust. A turbine element in the path of the exhaust then is spun by the exhaust gas. The turbine is connected by a shaft to the compressor, thereby allowing more air to be drawn into the engine in a Brayton cycle combustion process. Engine thrust depends upon exhaust gas velocity and mass flow rate of gas.

Jet engines contain afterburners which give the jet additional thrust. In some operating modes, such as take-off, supersonic flight, and combat situations, an increase in thrust is needed. This is particularly important in a combat situation when the pilot may need to quickly maneuver away from enemy fire. For these instances the afterburner is used. Thrust in an afterburning engine is increased by increasing both the mass of exhaust gases and the exhaust velocity.

As recognized by those skilled in the art of jet and rocket engine design, the use of afterburners requires a tremendous amount of additional fuel. Fuel is injected into the jet exhaust downstream of the turbine. This can increase thrust, but is very fuel inefficient, as the afterburner does not burn the fuel as efficiently as does the combustion section of a jet engine. A typical afterburner operates with exhaust gas that has limited oxygen content, which is insufficient for the complete combustion of the injected fuel, so some of the fuel is left unburned as it exits the afterburner.

A jet engine operating without the use of an afterburner is referred to as operating in dry mode, whereas an engine with an afterburner operating is referred to as operating in wet mode. When an afterburner is activated, large amounts of fuel are injected into the high-temperature, oxygen-deplete exhaust gases from the upstream combustion chamber(s) and turbine. Since the air has been used for combustion in the upstream combustion chamber(s), there is an insufficient amount of oxygen remaining to completely combust the large amount of fuel introduced in the afterburner. The use of afterburners, therefore, is a very inefficient process that wastes large amounts of fuel and introduces the volatile organic compounds into the atmosphere, usually at high altitudes. It is therefore desirable to have a device or means by which this added thrust can be achieved without having to use such tremendous amounts of fuel.

It is also known to those of ordinary skill in the art that heat-seeking missiles hone in on the hot areas of a target including the tailpipe and/or afterburner, exhaust nozzle, and the exhaust gas plume. The exhaust gases leaving the tailpipe form a plume that expands and cools. The jet exhaust may have a temperature between approximately 650° C. and 1300° C. depending on the type of engine and its operating conditions. On dry thrust, the tailpipe is the strongest radiator, and the plume is cooler, typically around 650° C. Using the afterburner may produce an exhaust plume of around 2000° C. or more.

Due to the high exhaust velocities needed for efficient jet engines, these engines generate a large amount of noise as their exhaust gases interact with ambient air creating shockwaves. A system is needed to minimize these developing shockwaves to reduce noise. Combustion gases exiting a jet engine also produce a great deal of heat which can be tracked by heat seeking missiles in military applications. Therefore a means to cool the exiting exhaust without limiting engine performance is also needed.

SUMMARY OF THE INVENTION

The principles and embodiments of the present invention relate to a device designed for integration with the exhaust pipe of a jet engine, wherein the device may be a separate component designed to attach to an existing jet engine exhaust pipe, or it may be an integral component of the exhaust pipe installed during the manufacture of the engine assembly. In an embodiment of the invention, the device supplies both a cooling liquid and an oxygen supply to the jet engine to increase its thrust and fuel efficiency, and reduce the temperature and the volume of sound produced by the engine.

The principles and embodiments of the present invention also relate to a system for increasing the thrust and fuel efficiency and reducing the thermal signature of a jet engine, comprising a supply of heat-reducing material, wherein the heat-reducing material is a non-flammable cryogenic liquid; a distribution manifold operatively associated and in fluid communication with the supply of heat-reducing material; and an injection component operatively associated and in fluid communication with the distribution manifold, wherein the heat-reducing material injection component is configured and positioned to inject the heat-reducing material into the hot exhaust gas from a jet engine; a supply of combustion-enhancing material, wherein the combustion-enhancing material is a liquid that can provide oxygen; a distribution manifold operatively associated and in fluid communication with the supply of combustion-enhancing material; and an injection component operatively associated and in fluid communication with the distribution manifold, wherein the combustion-enhancing material injection component is configured and positioned to inject the combustion-enhancing material into the hot exhaust gas from a jet engine, and wherein the combustion-enhancing material injection component is located upstream from the heat-reducing material injection component so the combustion-enhancing material is injected into the exhaust gas before the heat-reducing material.

Another embodiment relates to a system for increasing the thrust and fuel efficiency and reducing the thermal signature of a jet engine, comprising an exhaust gas heat attenuator; a first heat-reduction material reservoir for containing a heat-reduction material; a first distribution manifold; a second combustion-enhancing material reservoir containing combustion-enhancing material; a second distribution manifold; a second feed line having a first end connected to an outlet of the second reservoir and a second end connected to the second distribution manifold, wherein the second distribution manifold is in fluid communication with the second reservoir through the second feed line; a controller that controls the release of the heat-reduction material from the heat-reduction material reservoir and the combustion-enhancing material from the combustion-enhancing material reservoir for delivery to the exhaust gas heat attenuator, wherein the controller can initiate release of the heat-reduction material and the combustion-enhancing material independently or simultaneously.

Embodiments of the invention further relate to a controller that initiates introduction of the heat-reduction material simultaneously with introduction of the combustion-enhancing material to the exhaust gas heat attenuator to reduce the heat emitted by the jet engine while also increasing the thrust and fuel efficiency of the engine. The controller can also initiate introduction of the heat-reduction material simultaneously with introduction of the combustion-enhancing material to the exhaust gas heat attenuator when the controller recognizes a triggering event, which includes takeoff, activation of full throttle, and/or evasive maneuvers at high G-forces.

Embodiments of the present invention further relate to an exhaust gas heat attenuator comprising an adapter section suitably sized, configured, and dimensioned for attachment to the tailpipe of a jet engine; an inner casing suitably sized and dimensioned for containing the exhaust gases from the jet engine, wherein the inner casing is attached to the adapter section at a first end and has an opening to allow the exhaust gases to exit the inner casing to the atmosphere; an outer casing suitably sized and dimensioned to fit around the inner casing to forma gap between the inner and outer casing that shields the inner casing from the external environment, wherein the outer casing is attached to the ends of the inner casing by tapered front and back sections. In addition, the tapered front section of outer casing can have openings to allow intake of ambient air into a gap between the inner and outer casings.

Embodiments of the presently claimed invention also relate to the heat attenuator further comprising a first manifold comprising a first feed line having a first end connected to an outlet of the first reservoir and a second end connected to the first distribution manifold, wherein the first distribution manifold is in fluid communication through the first feed line; and a second manifold comprising a second feed tine having a first end connected to an outlet of the first reservoir and a second end connected to the second distribution manifold, wherein the second distribution manifold is fluid communication through the second feed line.

Embodiments of the presently claimed invention also relate to the heat attenuator further comprising a third manifold, wherein introduction of the heat-reduction material to the exhaust gas heat attenuator can be through the first manifold and the third manifold simultaneously without the introduction of the combustion-enhancing material to the exhaust gas heat attenuator to maximize the amount of heat reduction, when initiated by the controller.

The principles and embodiments of the presently claimed invention also relate to a device for increasing the thrust and fuel efficiency and reducing the thermal signature of a jet engine, comprising a chamber that is configured and dimensioned to be operatively associated and in fluid communication with an exhaust nozzle of a jet engine, and wherein the chamber comprises a chamber wall that receives the exhaust gases emitted from the jet engine at an inlet and expels the exhaust gases at an outlet when so attached; a first set of one or more injection ports arranged around the chamber, wherein the first set of injection ports are configured and dimensioned to introduce a cryogenic liquid into the chamber, and wherein the injection ports are operationally associated and in fluid communication with a source of cryogenic liquid; a second set of one or more injection ports arranged around the chamber, wherein the second set of injection ports are configured and dimensioned to introduce oxygen into the chamber, and wherein the injection ports are operationally associated and in fluid communication with a source of oxygen-supplying liquid; and a controller that activates and deactivates the injection of the cryogenic liquid and oxygen into the chamber, wherein the cryogenic liquid and oxygen can be activated at the same time so that the cryogenic liquid cools and increases the density of the exhaust gases that the oxygen is introduced for combustion. This allows a pilot to increase thrust while compensating for the increased heat by introducing the cryogenic liquid to cool the exhaust gasses. The combination of increased thrust and reduced temperatures improves the survivability of an aircraft by allowing it to increase speed as it masks its heat signature to avoid heat-seeking missiles.

The embodiments of the presently claimed invention also relate to a device which further comprises a first set of automated valves operatively associated with and in fluid communication with the first set of injection ports, wherein the automated valves are in electrical communication with the control to receive an electronic signal to introduce a cryogenic liquid into the chamber; and a second set of automated valves operatively associated with and in fluid communication with the second set of injection ports, wherein the automated valves are in electrical communication with the controller to receive an electronic signal to introduce oxygen into the chamber; wherein the controller can activate and deactivate the first set and the second set of valves independently; and an outer shell comprising a shell wall, wherein the outer shell is positioned around the chamber and separated a distance from the chamber wall to create an air baffle that insulates the chamber from the shell, so that the shell wall is at a lower temperature than the chamber wall.

The embodiments of the presently claimed invention also relate to a device which further comprises a third set of one or more injection ports arranged around the outlet of the chamber, wherein the third set of injection ports are configured and dimensioned to introduce a cryogenic liquid into the chamber, and wherein the third set of injection ports is located even with or downstream of the second set of injection ports; and a third set of automated valves operatively associated with and in fluid communication with the third set of injection ports, wherein the automated valves are in electrical communication with the con roller to receive an electronic signal to introduce a cryogenic liquid into the chamber, and wherein the second set of injection ports and the third set of injection ports can be activated at approximately the same time so the introduction of the cryogenic liquid into the exhaust gases compensates for the temperature increase caused by the introduction of the oxygen.

The embodiments of the presently claimed invention also relate to a device which further comprises nozzles attached to the first set of injection ports, and/or the second set of injection ports, and/or the third set of injection ports, wherein the nozzle(s) generate a particular spray pattern.

The embodiments of the presently claimed invention also relate to a device wherein the second set of injection ports are located down stream from the first set of injection ports.

An embodiment of the claimed invention relates to a jet engine attachment device comprising a means of coupling the device to the tailpipe of a jet engine, for coupling the device to a manufactured jet engine as an after market accessory, wherein the means of coupling can be an adapter section sized to provide a mating fit with the jet engine to which it would be attached; a means of containing the flow of the jet exhaust gases from the jet engine to the exhaust opening of the attachment device to confine the hot exhaust gases to a controlled volume of space during introduction of heat-reducing and/or combustion-enhancing materials, wherein the means of containing the jet exhaust gases can be an inner casing, and wherein the means of containing the flow of jet exhaust has a plurality of port for separately introducing a cryogenic fluid and an oxygen-supplying material into the exhaust gases; a means of shielding the exhaust gas containing means from the exterior environment to insulate and reduce the heat emitted by the containing means that produces a thermal signature, wherein the means of shielding the exhaust gas containing means can be an outer casing larger than and fitted around the inner casing; a means of storing a cryogenic liquid separate from the attachment device to provide a cooling material to the containing means, wherein the means of storing the cryogenic liquid can be an insulated container; a means of conveying a cryogenic liquid from the cryogenic liquid storage means to the cryogenic liquid introduction port(s) to distribute the pressurized cooling material evenly to the introduction port(s), wherein the means of conveying a cryogenic liquid is one or more conduits connected to and in fluid communication with the insulated container and the one or more introduction port(s); a means of storing an oxygen-supplying material separate from the attachment device and the cryogenic liquid storage means to provide additional oxygen to the oxygen-depleted exhaust gases to assisted further combustion of residual fuel, wherein the means of storing oxygen-supplying material can be an insulated container; and a means of conveying the oxygen-supplying material from the oxygen-supplying material storage means to the oxygen-supplying material introduction port(s) to distribute the pressurized oxygen material evenly to the introduction port(s), wherein the means of conveying a cryogenic liquid is one or more conduits connected to and in fluid communication with the cylinder and the one or more introduction port(s) to mask the heat signature of the gases exiting the containing means; and a means of controlling the introduction of the cryogenic fluid and the oxygen-supplying material into the exhaust gases within the exhaust gas containing means.

The principles and embodiments of the present invention also relate to a method of increasing the thrust and fuel efficiency and reducing the thermal signature and noise level of a jet engine, comprising affixing a shell forming a confined space to a tailpipe of the jet engine introducing a hot exhaust gas plume from a jet engine through a first opening in the shell forming the confined space; providing a supply of heat-reducing material and a supply of combustion-enhancing material; controlling the release of the heat-reducing material independently from the release of combustion-enhancing material; introducing the released combustion-enhancing material into the confined space containing the exhaust gas plume to combust at least a portion of unburned fuel present in the exhaust gases; introducing the released heat-reducing material into the confined space containing the exhaust gas plume to cool the hot exhaust gases of the plume; and allowing the cooled exhaust gas plume to exit the confined space through a second opening in the shell different from the first opening.

The principles and embodiments of the present invention also relate to a method of introducing the released heat-reducing material into the exhaust gas plume after the plume has exited the confined space to further mask the heat signature of the hot exhaust gases of the plume.

This application also expressly incorporates by reference in their entirety U.S. Non-provisional Application No. 13/679,868; filed Nov. 16, 2012, and U.S. Provisional Application No. 61/629,441 filed Nov. 18, 2011, for all purposes.

BRIEF DESCRIPTION OF THE DRAWINGS

Further features of the present invention, its nature and various advantages wilt become more apparent upon consideration of the following detailed description, taken in conjunction with the accompanying drawings, which are also illustrative of the best mode contemplated by the applicants, and in which like reference characters refer to like parts throughout, where:

FIG. 9 is a table showing experimental results of a test of an embodiment of the invention;

FIG. 10 is a table showing experimental results of a test of an embodiment of the invention.

DETAILED DESCRIPTION OF THE INVENTION

Figure 1:
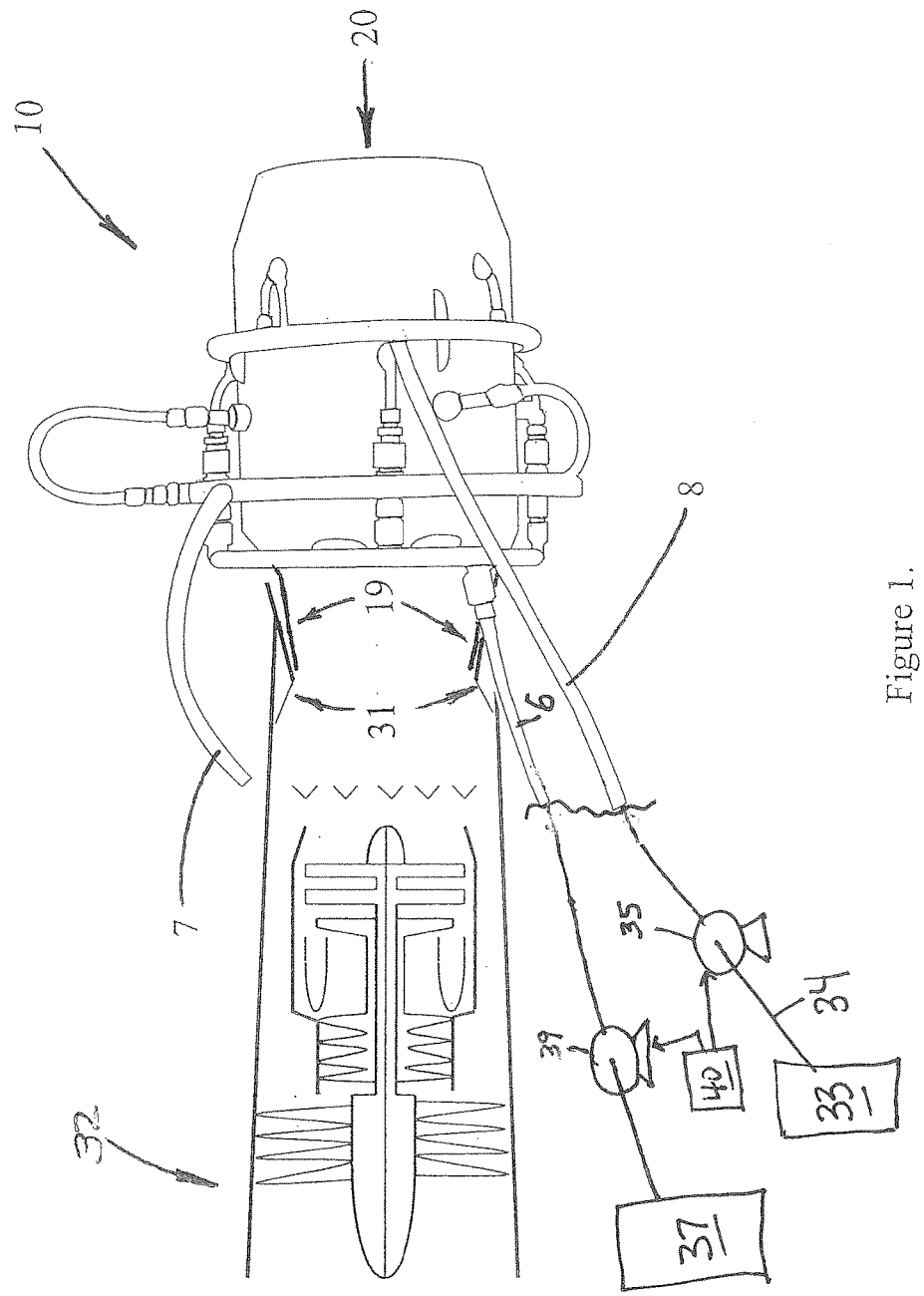
FIG. 1 is a line drawing of a jet engine and an illustration of an embodiment of the claimed invention.

The principles and embodiments of the present invention relate to systems and devices designed for attachment to the exhaust pipe of a jet engine to improve thrust, reduce the thermal signature, and reduce the noise level of a jet engine. Embodiments of the present invention, for example, may be a separate component designed to attach to an existing jet engine exhaust pipe, or it may be an integral component of the exhaust pipe installed during the manufacture of the engine assembly. The embodiments of the present invention are also directed to methods of improving the thrust and reducing the thermal signature and noise level of jet engines employing the embodiments of the various systems and devices.

Principles and embodiments of the invention also relate to injecting various materials into a jet engine to lower the temperature of the exhaust gases, increase the efficiency of the fuel combustion, and/or reduce the sound levels generated by the exhaust gases.

Principles and embodiments of the invention are also directed to means of reducing volatile organic compounds emitted into the atmosphere at high altitudes by improving combustion through the introduction of additional oxygen.

Principles and embodiments of the invention also relate to providing a source of heat-reducing material, and/or a source of oxygen-supplying material for introduction into the exhaust gases emitted from the tailpipe of a jet or internal combustion engine to reduce the temperature and noise level of the emitted gases.

Embodiments of the systems and devices of the present invention may comprise, for example, a reservoir for containing a supply of a heat-reduction material, a heat-reduction material injection component, and a material transfer line for conveying the heat reduction material from the heat-reduction material supply reservoir to the heat-reduction material injection component.

Embodiments of the systems and devices of the present invention may also comprise, for example, a reservoir for containing a supply of a combustion-enhancing material, a combustion-enhancing material injection component, and a material transfer conduit for conveying the combustion-enhancing material from the combustion-enhancing material supply reservoir to the combustion-enhancing material injection component.

Principles and embodiments of the present invention can also relate to methods of reducing the heat signature produced by a jet engine by injecting one or more heat-reduction materials into the exhaust gases emitted from the aft section of the engine to lower the overall temperature and energy of the exhaust gases, which is preferably by at least 43%, or more preferably by at least 75%, and most preferably to at least ambient temperature. The temperature reduction may thereby be sufficient to prevent detection of the exhaust plume by infra-red seeking missiles, and/or differentiation of the exhaust from the background.

In embodiments of the present invention, a heat-reduction material is contained within a suitable reservoir until required for injection into the hot exhaust gases of the jet engine. In preferred embodiments, the heat-reduction material is a non-flammable cryogenic liquid. In preferred embodiments of the invention the non-flammable cryogenic is liquid nitrogen.

Principles and embodiments of the present invention also relate to systems and methods for introducing additional oxygen into the exhaust gases entering the jet exhaust nozzle before introducing fuel to an afterburner.

In embodiments of the invention, the heat-reduction material and combustion-enhancing material are delivered from separate supplies through parallel manifolds in fluid communication with the heat-reduction material reservoir and combustion-enhancing material reservoir to separate injection nozzles arranged on a single mounting component attached to the tail pipe of the jet engine.

Principles and embodiments o the present invention also relate to systems and methods for introducing additional fuel into the exhaust gases entering the attachment device, so the device also operates as an afterburner, as well as introducing additional oxygen to the fuel-exhaust gas mixture to increase thrust output while improving fuel utilization and efficiency.

Principles and embodiments of the present invention also relate to a system for providing a source of oxygen from a reservoir and injection device to supply oxygen to an afterburner, wherein the material used as a source of oxygen can be a liquid. Preferred sources of oxygen are hydrogen peroxide, ozone, and/or nitrous oxide, which can decompose to form oxygen; however, other sources of oxygen that can be delivered as a liquid spray, gas, or vapor are also contemplated within the scope of the invention. The oxygen can be introduced directly into the tailpipe of the jet engine or into a separate chamber attached to the tailpipe of the jet engine.

In other embodiments of the invention the hydrogen peroxide is provided as a solution having a concentration between 2% and 99%, or more preferably between 25% and 70%, and most preferably between 50% and 53%, although other intermediate and overlapping ranges with 2% and 99% are acceptable, Hydrogen peroxide is preferably stored in a passivated aluminum tank with a relief vent to prevent build up of pressure, A suitable pump can pump the hydrogen peroxide at pressures of about 50 to 100 psi to feed to an injector and into a chamber which holds a catalyst, The catalyst enhances the decomposition of hydrogen peroxide into oxygen and water vapor. In other embodiments, the heat-reducing material and combustion-enhancing materials can be pressurized or pumped at pressures between 25 and 500 psi.

Principles and embodiments of the invention also relate to methods of reducing the heat signature produced by a jet engine by introducing a cooling liquid into the hot exhaust gases within the tailpipe of a turbojet engine to absorb the heat and thereby lower the temperature and reduce the noise level of the exhaust gases exiting the tail pipe. The cooling liquid can be introduced directly into the tailpipe of the jet engine or into a separate chamber attached to the tailpipe of the jet engine.

In another embodiment of the invention, the cooling liquid is sprayed into the exhaust plume leaving the turbojet tailpipe at the tailpipe opening.

In other embodiments of the invention the cooling liquid is sprayed into the exhaust at multiple points both within the tailpipe and at the exit opening of the tailpipe to maximize the reduction in temperature of the exhaust gases.

The following embodiments and examples present different possible arrangements of the components of the various systems or steps of the various methods contemplated and are intended as illustrative and non-limiting representations to help explain the inventive concepts contemplated within the principles and scope of the present invention. All variations and modifications should also be considered within the scope of the invention as set forth in the claims.

Embodiments of the claimed invention also relate to an attachment device, referred to as an exhaust gas heat attenuator, comprising a tube having a diameter that can be larger than the diameter of the jet engine exhaust pipe, and more specifically, sufficiently large so that it may slip over the jet engine exhaust pipe and engage the outer circumference of the pipe like a sleeve. The exhaust gas heat attenuator can also be sized to fit over the exhaust pipe of an auxiliary power unit (APU) or the exhaust of an internal combustion engine, for example, a 2-stroke or 4-stroke piston engine, without the injection of a combustion-enhancing material. As explained in greater detail below with respect to the additional components of the device, the inventive jet engine exhaust gas heat attenuator is designed to reduce the heat signature of the jet engine, reduce the noise level of the engine (i.e. reduce the number of decibels), and provide added thrust when needed, thereby eliminating the need of the engine's afterburners. The exhaust gas heat attenuator further comprises a body for confining and directing the exhaust gases from an exhaust gas inlet through the interior of the heat attenuator to an outlet, where the body preferably has a cylindrical shape open at both ends. Other shapes and cross-sections, including, square, rectangular, ellipsoid, oval, hexagonal, and triangular are contemplated and considered within the scope of he invention. The body of the heat attenuator can also comprise two concentric walls forming an annular space between an inner wall and an outer wall. The double-walled body (preferably comprises an inner tube and an outer tube around the inner tube forming a gap there-between, wherein the gap is preferably between 1-5 inches.

In embodiments of the claimed invention, the exhaust gas heat attenuator comprises a body having an adapter section, a combustion section, and an exhaust opening, in which the combustion section is located between the adapter section and the exhaust opening. The heat attenuator can be made of materials suitable for the high temperatures and exhaust velocities generated by a jet engine, for example, titanium, stainless steel, or high performance alloys such as Inconel®, Hastelloy®, Waspaloy®, Nitronic®, or Monel®.

The adapter section can be a cylindrical metal tube having a diameter suitable to slide over the end of the exhaust nozzle or tailpipe of a turbojet engine. The inner diameter of the adapter section can be selected to match the outer diameter of the jet tailpipe or exhaust nozzle it is intended to fit over, so that the adapter can be affixed to the tailpipe or exhaust nozzle. For example, the F100-P W-100 jet engine of the F-16 fighter has a diameter of approximately 46 inches, which the adapter section would be sized to fit over. Other jet engines for military and commercial aircraft have different sized exhausts that would need to be appropriately fitted.

In embodiments of the claimed invention, the adapter can be suitably sized to form a slip fit over the tail pipe with minimal clearance necessary to allow the adapter to be affixed to the jet engine, wherein the adapter can be affixed to the tailpipe through welding and/or the use of mechanical fasteners. Weld joints can be single or double lap joints or plug welds, as would be known in the art. Mechanical fasteners can be rivets, nuts and bolts, or screws. The device can also be welded to the end of the jet engine tailpipe using butt welds, as would be known in the art. The type of weld or fastener can be selected based upon the working environment, the load on the engine and device components, and other factors such as lifespan of the part and ease of maintenance, as would be known to a person of ordinary skill.

In other embodiments, the adapter can be sized to fit into the inner diameter of the tailpipe or have a flange of suitable size to mount the exhaust gas heat attenuator directly to the end face of the jet tailpipe. In another embodiment, a second flange can be welded to the end-face of the tailpipe if one is not already present.

The combustion section can comprise an inner casing and an outer casing, wherein the outer casing forms the exterior shell and surface of the exhaust gas heat attenuator. The inner casing can have a diameter the same size as or larger than the outside diameter of the adapter, and less than the inner diameter of the outer casing. The inner casing fits within the outer casing and forms a barrier to the hot exhaust gases entering the adapter from the jet engine tail pipe, which contains the heat and shields the outer casing from direct contact with the exhaust gases. The inner casing prevents the hot exhaust gases from expanding prematurely so the gases can be cooled and residual fuel can be burned before the exhaust plume escapes into the atmosphere and gives off its thermal signature. The inner casing also maintains the pressure and direction of flow of the exhaust gases in order to maintain thrust and the proper conditions to cause additional combustion. The outer casing shields the inner casing and reduces the heat signature of the exhaust gas heat attenuator by forming a layer of cooler air between the inner casing and the outer casing.

The layer of air between the inner and outer casings can be a still insulating layer trapped between the two casings or a circulating layer of coot ambient air entering into the air space between the casings through openings at a front end located nearer the adapter and exiting through openings at the back end further from the adapter. This ambient air baffle can reduce the heat transferred from the hot exhaust gases to the outer casing, such that the temperature of the outer casing can be approximately 20% to 60%, or more preferably 60% to 80% less than the temperature of the inner casing. This results in a reduced heat signature from the rear section of the jet engine, which is typically one of the hottest exposed sections. The reduction in the exterior temperature from the engine helps reduce the distance at which the infrared signature is observable and a heat-seeking missile can lock on.

The gap between the inner casing and the outer casing can be between approximately 1" and 5", and more preferably between 2" and 4". The size of the gap can be determined by the temperature and amount of hot gases passing through the inner casing and the desired temperature of the outer casing to determine a temperature gradient across the gap and ambient air flow baffle, as would be known in the art. In an example of an embodiment of the claimed invention, the inner casing has a length of 26 inches, and the outer casing has a length of 17.5 inches to 20 inches. The back end of the inner and outer casings can be tapered to form an exhaust opening that is smaller in diameter than the inner and outer casing diameters.

In other embodiments, the inner casing can be sized and dimensioned to be directly attached to the exhaust pipe of a jet engine, as described elsewhere in the specification. In such an embodiment, the inner casing will be sufficiently longer and have the same inner and outer diameters as the adapter section would have been. In this manner the longer front section of the inner casing performs the same role as the adapter section, and the portion of the casing fitting over or into the engine tailpipe, and affixed thereto, is considered the adapter section.

Embodiments of the heat attenuator system further include one or more manifolds, where the manifolds can comprise one or more heat-reduction material distribution collar(s), inlet feed lines, outlet feed lines, and injection ports or nozzles, or one or more combustion-enhancing material distribution collar(s), inlet feed lines, outlet feed lines, and injection ports or nozzles, The heat-reduction material manifold can am parallel to the combustion-enhancing material manifold.

The distribution collar(s) can be formed of hollow tubing made of suitable materials joined together at the ends to create a torus. For example, materials suitable for low temperature and high pressure operation including but not limited to aluminum, titanium, stainless steel, or high performance alloys such as Inconel®, Hastelloy®, Waspaloy®, Nitronic®, or Monel®, etc., can be attached by welding, brazing, or threaded fittings and gaskets, as would be known to those of ordinary skill in the art. The collar is attached to the outer casing of the exhaust gas heat attenuator using brackets or standoffs , and the components can be joined by welds, brazing, or mechanical fasteners, as would be suitable for the particular size and operating conditions of the system.

One or more fittings suitable for the pressures, temperatures, and chemical properties of the heat-reduction material or combustion-enhancing material can be attached to the collar, The fittings allow the connection and disconnection of suitable feed lines, valves and/or regulators Suitable feed lines made of flexible cryogenic hoses or straight or corrugated solid tubing are attached at a first end to the heat-reduction material reservoir(s), and the combustion-enhancing material reservoir(s), and to the heat-reduction material distribution collar(s) or combustion-enhancing material distribution collar(s) at a second end. The hollow hoses or tubing form at least a liquid-tight but preferably gas-tight conduit from the material reservoir(s) to the distribution collar(s). Suitable valves and regulators can be attached to the reservoir, feed line or fitting to control the flow rates and internal pressures of the heat-reduction material and the combustion-enhancing material through their respective manifolds. The manifolds are preferably coated and insulated to reduce heat transfer to the cryogenic liquids or from the oxygen supply liquid.

A second set of feed lines are attached at a first end to the heat-reduction material distribution collar(s) using suitable fittings, and to one or more injection ports or nozzles at the second end. The injection ports are formed in the inner casing and the nozzles are affixed to the inner casing, The feed lines pass through the outer casing and the air baffle to the inner casing.

In embodiments of the invention, conduits such as solid tubing, can pass through the outer casing to the inner casing and connect to the injection ports formed in the inner casing, or can connect to injection nozzles that are attached to the inner casing by welding, brazing, or threaded fittings and gaskets, as would be known to those of ordinary skill in the art. An injection port is an open end of the tubing or attachment fitting facing into the inner casing, whereas a nozzle is a component having an opening with a specific size and geometry to permit various material flow rates and produce a particular spray, wherein the spray can be a cone- or fan-shaped dispersal of droplets or more preferably an atomized mist. In a preferred embodiment, the injection port or nozzle would be essentially flush with the surface of the inner casing, such that it would only protrude into the exhaust gas stream enough to permit material injection without interference from the casing wall.

In embodiments of the invention, the injection port or nozzle can have an angle $\theta$ from 0° to 90° from the surface of the inner casing. A 90° injection angle would be normal to the surface of the casing, and inject the material directly into the exhaust gas stream. A 0° injection angle would be parallel to the surface of the casing, and inject the material along the flow of the exhaust gas stream. The injection port(s) and/or nozzles can also form an angle $\phi$ from the direction of the exhaust gas flow. A 90° injection angle would be parallel to the surface of the casing, but perpendicular to the direction of the gas flow, and inject the material along the curved cylindrical surface resulting in a slightly helical flow. A 0° injection angle would be parallel to the surface of the casing, and parallel to the gas flow, so the injected material would flow along the surface of the inner casing with the exhaust gas stream.

In other embodiments, the extent that the nozzle or injection port conduit extends into the inner casing can also be adjusted, so that the heat-reducing and combustion enhancing materials can be injected into different parts of the exhaust gas plume passing through the space within the inner casing.

In other embodiments, the length of tubing or nozzle projecting into the inner casing and exhaust gas stream can be adjusted, so the injected material, whether heat-reduction material or combustion-enhancing material, can be better positioned in the gas flow, This, however, can introduce turbulence and instabilities to the gas flow, and possibly interfere with flame propagation.

In other embodiments, a second set of one or more feed lines are connected to the heat-reduction material distribution collar(s) and pass through the outer casing where they then run parallel with the inner and outer casing to the exhaust end of the exhaust gas heat attenuator.

The injection ports and nozzles are preferably arranged symmetrically around the inner casing and around the annular gap between the inner and outer casings and can extend to the opening at the back end of the exhaust gas heat attenuator.

In embodiments of the invention a supply of heat-reduction material is contained within a reservoir for delivery through one or more supply lines to a plurality of nozzles arranged within the exhaust gas heat attenuator. The reservoir is preferably an insulated metal container that can hold a cryogenic liquid under pressure for an indefinite period of time. The reservoir is more preferably an insulated metal cylinder having a size sufficient to contain enough of the cryogenic liquid to reduce the heat signature of the turbojet engine and exhaust plume during a takeoff and a landing. The reservoir is more preferably an aluminum cylinder with an insulating ceramic coating and an exterior insulating wrap to reduce boil-off of the non-flammable, cryogenic liquid.

The preferred non-flammable, cryogenic liquids include liquid nitrogen, liquid carbon dioxide, and liquid argon. The cryogenic liquid is transferred from the reservoir to an injection component through a manifold to the hot exhaust gases.

In embodiments of the invention, the cryogenic liquid is pumped through the manifold under the force generated by the build-up of gas pressure from evaporation of the cryogenic liquid itself. In other embodiments, a pump suitable for cryogenic liquids can be used to maintain a steady pressure and flow rate regardless of the amount of liquid contained within the system or the rate of evaporation.

Embodiments of the claimed invention relate to a combustion-enhancement system which includes one or more reservoirs for containing a combustion-enhancement material; one or more manifolds, where the manifolds can comprise one or more combustion-enhancement material distribution collar(s), inlet feed tines, a catalyst chamber, outlet feed lines, and injection ports or nozzles. The combustion-enhancing material manifold can run parallel to the heat-reduction material manifold in the exhaust gas heat attenuator and conveys the combustion-enhancement material to the inner casing.

The combustion-enhancement system includes a reservoir for storage of the combustion-enhancement material. The combustion-enhancement material is preferably a liquid that can supply additional oxygen to the exhaust gas within the inner casing of the heat attenuator. The oxygen supplying liquid may be at low temperatures and high pressures, such as for nitrous oxide, or a liquid at standard temperature and pressure, such as hydrogen peroxide. The reservoir is preferably a metal container suitable for containing an oxygen supplying material, such as hydrogen peroxide, ozone, and nitrous oxide, and more preferably a passivated aluminum tank that can withstand the pressure of built-up oxygen.

In some embodiments, a pump may be connected to the reservoir to pump hydrogen peroxide from the reservoir through the manifold to the injection port(s) or nozzle(s). The pump is sized and dimensioned to pump a sufficient amount of hydrogen peroxide through the manifold and catalyst to supply a predetermined amount of oxygen to the inner casing of the heat attenuator. The pump is used to maintain a suitable flow rate and pressure. The pump is made of materials suitable for handling hydrogen peroxide as is known in the art.

In other embodiments in which the oxygen-supplying material is a cryogenic or pressurized liquid or gas, such as nitrous oxide or ozone, the pressure within the reservoir can be used to move the material through the system without a pump.

The combustion-enhancement material distribution collar(s) can be formed of hollow tubing made of suitable materials joined together at the ends to create a torus, For example, materials suitable for exposure to oxygen and oxidizing atmospheres and high pressure operation such as aluminum, titanium, stainless steel, or high performance alloys such as Inconel®, Hastelloy®, Waspaloy®, Nitronic®, or Monel®, etc., can be attached by welding, brazing, or threaded fittings and gaskets, as would be known to those of ordinary skill in the art. The connections must be air tight to prevent the release of gaseous oxygen within a confined space within an aircraft. The collar is attached to the outer casing of the exhaust gas heat attenuator using brackets or standoffs, and the components can be joined by welds, brazing, or mechanical fasteners, as would be suitable for the particular size and operating conditions of the system.

One or more fittings suitable for the pressures, temperatures, and chemical properties of the heat-reduction material or combustion-enhancing material can be attached to the collar. The fittings allow the connection and disconnection of suitable feed lines, valves and/or regulators.

A catalyst chamber is attached to the inlet fitting(s) of the distribution collar. The catalyst chamber contains a material suitable for decomposing the oxygen supplying liquid to oxygen gas and any residual material. The catalyst can be in the form of a wool or mesh, or pellets or powder retained by suitably sized screens to retain the catalyst within the catalyst chamber. The preferred catalyst for decomposition of hydrogen peroxide is either pure silver wool or mesh or potassium permanganate coated alumina pellets or a combination of both. Other catalysts know to those of ordinary skill in the art for decomposing the oxygen-supplying material can also be used. For example, hydrogen peroxide is decomposed into oxygen and water vapor by a silver catalyst, nitrous oxide can be decomposed into nitrogen and oxygen using gold or platinum at high temperatures and/or pressures as known in the art. In a preferred embodiment, a 50%-53% hydrogen peroxide solution is decomposed over a silver wool having a surface area sufficient to decompose the peroxide at a given flow rate. In general about 0.02 $m^2$ of 50 mesh silver wool or gauze is used to react 500 ml of 90% hydrogen peroxide per second to increase fuel efficiency by approximately 10%. The hydrogen peroxide is preferably pumped at a pressure of 30-50 psi to maintain a free flow though the packed catalyst chamber. The increase in thrust and performance should be approximately 25% from the injection of oxygen when activated.

The decomposed oxygen supplying liquid is then passed through a nozzle into the inner casing to operate as an afterburner by combusting at least some of the unburned filet from the jet engine exhaust, or additional fuel injected into the inner casing.

Ozone gas or oxygen gas under pressure may also be used to supply oxygen without the need of catalytic decomposition to oxygen.

Suitable feed lines made of flexible hoses or straight or corrugated solid tubing are attached at a first end to the combustion-enhancing material reservoir(s), and to the catalyst chamber (s) at a second end. The catalyst chamber(s) are connected to the combustion-enhancement material distribution collar(s). The hollow hoses or tubing form a gas-tight conduit from the material reservoir(s) to the distribution collar(s). Suitable valves and regulators can be attached to the reservoir, feed line or fitting to control the flow rates and internal pressures of the combustion-enhancing material through the manifold. The manifold is preferably coated and insulated to reduce heat transfer to the combustion-enhancing material. In preferred embodiments, the coating is a ceramic coating, including a coating provided by Jet Hot known as Jet-Hot Extreme®.

A second set of feed lines are attached at a first end to the heat-reduction material distribution collar(s) using suitable fittings, and to one or more injection ports or nozzles at the second end. The injection ports are formed in the inner casing and the nozzles are affixed to the inner casing. The feed lines pass through the outer casing and the air baffle to the inner casing.

In embodiments of the invention, conduits such as hollow tubing, can pass through the outer casing to the inner casing and connect to the injection ports formed in the inner casing, or can connect to injection nozzles that are attached to the inner casing by welding, brazing, or threaded fittings and gaskets, as would be known to those of ordinary skill in the art. An injection port is an open end of the tubing or attachment fitting facing into the inner casing, whereas a nozzle is a component having an opening with a specific size and geometry to permit various material flow rates and produce a particular spray, wherein the spray can be a cone- or fan-shaped dispersal of droplets or more preferably an atomized mist. In a preferred embodiment, the injection port or nozzle would be essentially flush with the surface of the inner casing, such that it would only protrude into the exhaust as stream enough to permit material injection without interference from the casing wall.

In some embodiments, one or more fuel line(s) can pass through the outer casing of the heat attenuator and attach to injection nozzles affixed to the inner casing. In the embodiment, fuel is injected into the inner casing along with the combustion-enhancement material to create a high efficiency afterburner. The additional oxygen increases the amount of fuel that is combusted, thereby reducing the amount of fuel introduced into the inner casing to produce a particular amount of thrust. The additional oxygen also reduces the amount of volatile organic compounds ejected into the atmosphere.

Embodiments of the claimed invention can utilize a computer or a dedicated processor and/or ASICs to control automated valves and regulators within the combustion-enhancement system and heat-reduction system.

In other embodiment, valves and regulators within the combustion-enhancement system and heat-reduction system can be controlled manually or electrically with relays without the use of a computer or ASICs.

A controller that activates and deactivates the components of the system can comprise any combination of computer(s), ASICs, electrical, and mechanical controls. The controller can initiate the release of the heat-reducing materials and/or combustion-enhancing materials from their respective reservoirs or cause the materials to flow out of their associated injection ports and nozzles by activating a valve or pump to cause the material to flow. The controller can activate or restrict flow based on triggering events, including applying full throttle to the jet engine, detecting take-off or high g maneuvering, or other events that would involve increased demands for thrust, as known to persons of ordinary skill in the aviation arts.

Embodiments of the claimed invention also relate to having the controller separately control the release of the heat-reducing material from the supply of heat-reducing material and the release of combustion enhancing material from a supply of combustion enhancing material by automatically opening and closing valves or adjusting regulators. The controller can also separately control the injection of the heat-reducing material and combustion enhancing material into a chamber to cool hot exhaust gases and initiate additional combustion of unburned fuel. The controller can activate the valves and regulators to simultaneously introduce the materials to compensate for the increased combustion by introducing the heat-reducing material.

Embodiments of the method attic present invention relate to reducing the amount of heat in the exhaust gases of a jet engine by injecting a sufficient amount of heat-reducing material to lower the overall temperature of the exhaust gas plume emitted from the tailpipe of a jet engine through the attachment device.

Embodiments of the method also relate to increasing the thrust and fuel efficiency and reducing the thermal signature and noise level of a jet engine by affixing a shell forming a confined space to a tailpipe of the jet engine, where the shell is at least a cylinder open at each end, for example, the inner casing of the heat attenuator. The method comprises introducing the hot exhaust gas plume from the jet engine through the first opening in the shell forming the confined space, where the opening can be at one end of the shell; providing a supply of heat-reducing material and a supply of combustion-enhancing material; controlling the release of the heat-reducing material independently from the release of combustion-enhancing material, introducing the released combustion-enhancing material into the confined space containing the exhaust gas plume to combust at least a portion of unburned fuel present in the exhaust gases; introducing the released heat-reducing material into the confined space containing the exhaust gas plume to cool the hot exhaust gases of the plume; and allowing the cooled exhaust gas plume to exit the confined space through a second opening in the shell, where the second opening can be at the opposite end of the shell from the first opening. In a preferred embodiment the thrust should be increased 25%.

The heat reducing material can be non-flammable cryogenic fluid, including liquid nitrogen, liquid carbon dioxide and liquid argon. Nitrogen is a gas at room temperature and a liquid at −196° C. (77 K; −321° F.). Nitrogen also has heat of vaporization ($N_2$) 5.56 kJ·mol$^{-1}$ and molar heat capacity ($N_2$) 29.124 J·mol$^{-1}$·K$^{-1}$. Carbon dioxide is a gas at room temperature, a solid at −78° C., 194.7 K, −109° F. and atmospheric pressure, and a liquid at −57° C., 216.6 K, −70° F., but requires a pressure of 5.185 bar. Carbon dioxide also has a standard enthalpy change of vaporization of $\Delta_{vap}H^\ominus$ 15.326 kJ/mol at −57.5° C., and a heat capacity, ($CO_2$) $C_p$ 2.534 J/(mol K) at 15.52 K, 47.11 J/(mol K) at 146.48 K, and 54.55 J/(mol K) at 189.78 K. Argon is a gas at room temperature and a liquid at 87.30 K, −185.85° C., −302.53° F., and has a heat of vaporization of 6.43 kJ·mol$^{-1}$, and a molar heat capacity of (Ar) 20.786 J·mol$^{-1}$·K$^{-1}$. It can be seen that each of the materials have very low temperatures in the liquid phase and will absorb energy (heat) when mixed with a warmer material, thereby lowering the material's temperature.

The temperature of the exhaust plume is reduced by providing a supply of heat-reducing material in a reservoir, and transferring the heat-reducing material from the reservoir through a manifold to one or more injection ports, where the heat-reducing material is sprayed into the exhaust gases within an inner casing of the attachment device. The heat-reducing material can also be sprayed into the exhaust plume exiting the inner casing. The material can be sprayed as a solid cone or as a flatter fan-shaped spray.

The following examples described in reference to the illustrative figures further elucidate particular features or applications of the preferred embodiments of the method and system described herein, and are not meant to limit the scope of the presently claimed invention.

FIG. 1 illustrates an embodiment of the attachment device 10 attached to the exhaust pipe 31 of a jet engine 32. The attachment device 10 is inserted into the exhaust pipe 31 of the engine 32 in this example, however in other embodiments, the device is fitted around the exterior of the tailpipe or attached directly to the end of the tail pipe. The attachment device therefore becomes operatively associated with the jet engine and receives the exhaust gases from the tailpipe at the inlet opening 19 of the attachment device 10. Flexible feed lines 7,8 provide a heat-reduction material from means for storing the same, such as a supply 33 for injection into device 10.

Figure 2:
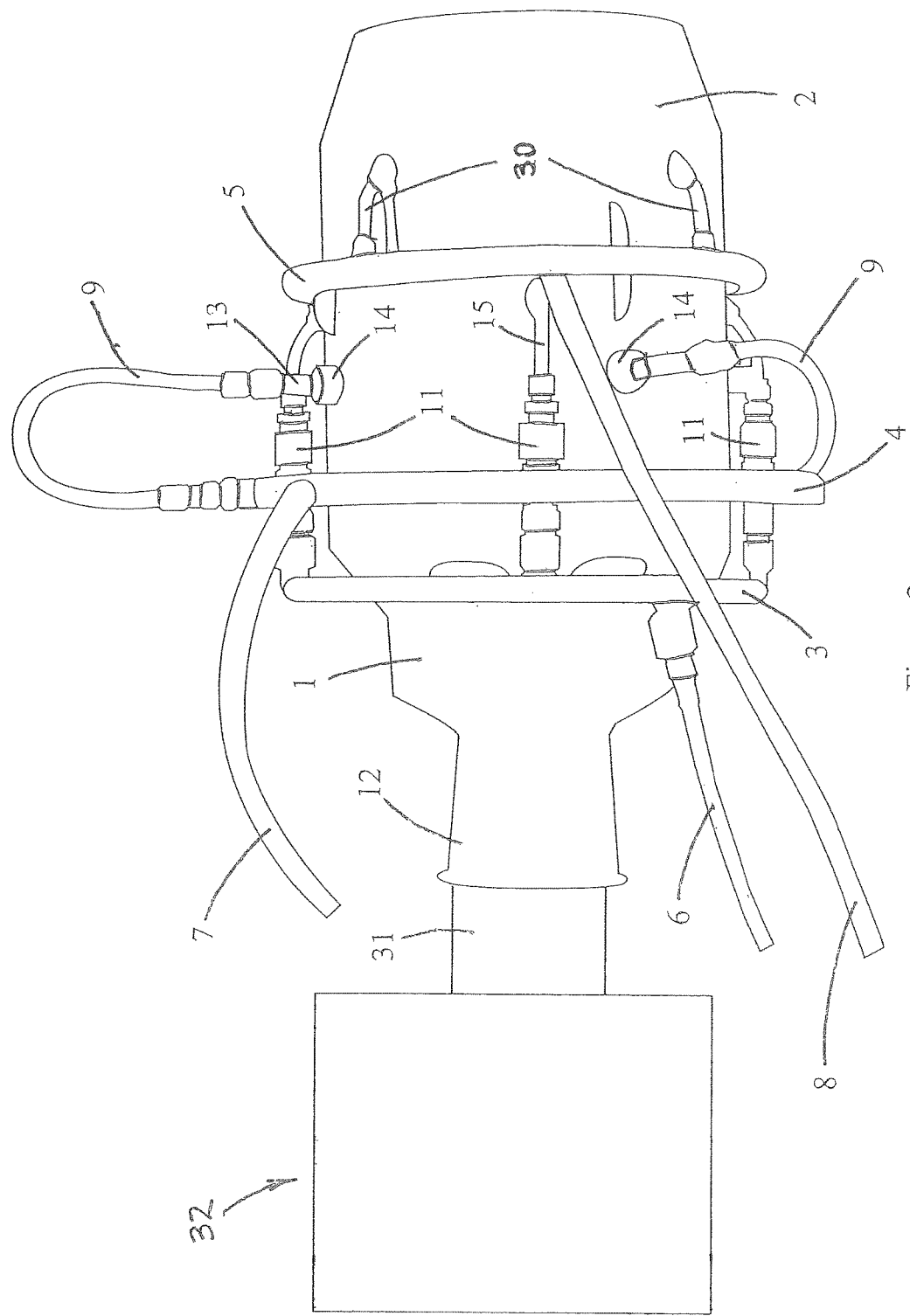
FIG. 2 is a line drawing of a side view of the external features of an embodiment of the claimed invention.

FIG. 2 shows a larger view of an embodiment of the device 10 attached with a tapered adapter section 12 over the exhaust pipe 31 of a jet engine 30. (The jet engine and exhaust pipe in FIG. 2 are shown in a block format for simplicity.) As shown in 2 and 3, the device 10 comprises three hollow collars 3,4,5. Collar 5 is positioned closest to the outlet or exhaust openin2 20 of the device while collar 4 is positioned closer to the point of attachment of the device to the exhaust pipe 1. Collar 5 comprises a hollow male fitting, which is in liquid communication with the interior of the hollow collar 5. The male fitting may be threaded for engagement with a flexible feed lines 6,7,8 (see FIG. 2). A flexible hose 8 is connected to and in fluid communication with a pump 35 which pumps a non-flammable cryogenic liquid, preferably liquid nitrogen, from means for storing the same such as a storage tank 33 via a conduit 34 through the hose 8 and into the collar 5, where it is released through nozzles 17. (The tank 33, pump 35 and controller 40 are shown schematically.) Nozzles 17 are in fluid communication with the collar 5 and extend through the outer casing 2 of the device body and curve outward so that the nitrogen may be expelled out of the device parallel with the travel path of the fuel exhaust during operation. When actuated by controller 40, the pump 35 directs the cryogenic liquid, e.g., liquid nitrogen, to hose 8. By pumping the liquid nitrogen through the collar 5 and out through the nozzles 17, the nitrogen acts like a blanket to reduce the heat signature of the engine's exhaust as well as reduce the noise level of the engine.

The principles and embodiments of the present invention also relate to a second feature that provides additional thrust without requiring the injection of any additional jet engine fuel within the attachment device. Specifically. the inventive device comprises a hollow collar 3 similar to the tubular coolant collars 4,5 described above. The collar 3 also comprises a male fitting that is in communication with the hollow interior of the collar 3 and designed to attach to a second flexible feed line 6, which in turn is connected to a pump 39 and a tank 37 containing hydrogen peroxide. (The tank 37, pump 39 and controller 40 are shown schematically.)

As shown in FIG. 2, the tank or reservoir 37 and pump 39 are connected to conduit 6. When actuated by controller 40, the pump forces the hydrogen peroxide through the flexible feed line 6 and into the collar 3, Attached to the collar 3 is a hollow tube 11 containing a catalyst. This catalyst chamber 11, shown in FIGS. 2 and 5, contains a suitable catalyst for decomposing the oxygen-supplying hydrogen peroxide liquid to oxygen along with any residual materials such as nitrogen ($N_2$) from the decomposition of nitrous oxide ($N_2O$) or water ($H_2O$) from hydrogen peroxide ($H_2O_2$). Feed line 15 connects to the outlet of the catalyst chamber 11 and runs through the interior of the outer casing 2 of the device, and then curves towards the exhaust opening 20, similar to nozzles 17 described above for collar 5. As the hydrogen peroxide flows through the catalyst, the hydrogen peroxide decomposes to water and oxygen gas. The oxygen gas flows through the nozzles 16 and exits parallel with the travel path of the jet engine's exhaust. The water produced from the reaction evaporates due to the high temperature, and the generated oxygen gas is ignited by the heat of the exhaust to burn at least a portion of any residual fuel to produce added thrust.

Alternatively. automated valves or regulators can be attached to the reservoir or feed line to control the flow rates and internal pressures of the heat-reduction material and the combustion-enhancing material. The valves or regulators may be used instead of pumps 35, 39.

The number of nozzles 16,17 extending from the collars 4,5 and through the outer body of the device may be less than or greater than the four nozzles shown in the exemplary illustrations. Similarly, the nozzles 16,17 may have different sizes, configurations, and dimensions. The controller 40 is a means for controlling the pumps in that it that activates deactivates pumps 35, 39 as necessary and can comprise any combination of computer(s), ASICs, electrical, and mechanical controls.

Figure 3:
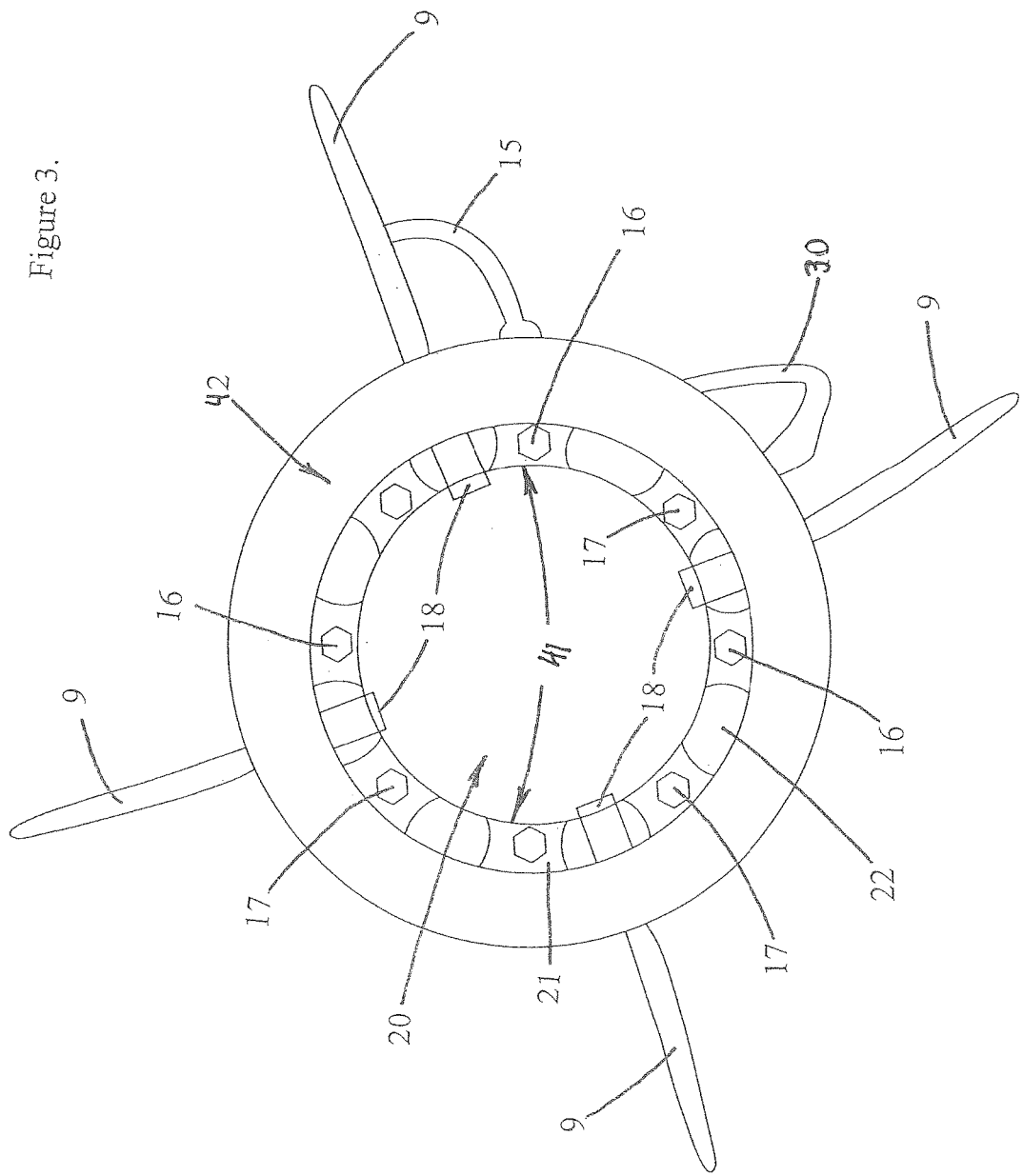
FIG. 3 is a line drawing of a rear view of the features of an embodiment of the claimed invention.

FIG. 3 illustrates an embodiment of the invention from the rear showing four cryogenic liquid injection nozzles 16 and four oxygen supplying nozzles 17 arranged symmetrically around the exhaust opening 20 in the air gap 26 between the inner casing 41 and the outer casing 42, where the tapered portion of the outer casing 2 is being viewed from behind. The nozzles 16,17 are attached to and supported by flanges or stand-offs 21 attached to the inner face of the outer casing 42 and the outer face of the inner casing 41. Feed lines 15 (only one is shown for clarity) connects cryogenic liquid nozzles to the manifold and cryogenic liquid reservoir(s). Feed lines 30 (only one is shown for clarity) connects oxygen supplying nozzles 17 to a manifold and oxygen-supplying material reservoir(s). Openings 22 between the flanges 21 allow cooler ambient air to flow through the gap between the inner 41 and outer 42 casings to provide an air baffle, Additionally, four cryogenic liquid injection ports 18 connected to cryogenic liquid feed lines 9 are shown arranged symmetrically around the interior of the inner casing 41. The injection ports can be directed perpendicularly into the exhaust gases passing through the inner casing, or parallel to the flow of exhaust gases. Nozzles for providing particular spray patterns, for example, atomized mist, fan-shaped spray, a solid cone, or a directed stream, and having different sized droplets can be attached or substituted for the open injection ports.

While the illustrated example depicts four cryogenic liquid injection nozzles 16, four injection ports 18, and four oxygen supplying nozzles 17, a smaller or larger number of nozzles and ports 16,17,18 may be employed to achieve the desired noise and/or heat reduction, and as dictated by the size of the jet engine to which the attachment device 10 is attached, and are considered within the scope of the invention.

The exhaust gases pass through the inner casing 41, and cryogenic liquid can be injected into the gases from cryogenic liquid injection ports 18 connected to cryogenic liquid feed lines 9 before the exhaust gases arrive at the oxygen supplying nozzles 17, so the hot exhaust gases can be cooled and densified prior to initiating additional combustion with the injected oxygen, In other embodiments, the cryogenic liquid injection ports 18 can be placed just before or adjacent to the oxygen supplying nozzles 17, so the injected oxygen is cooled and densified before interacting with the hot exhaust gases.

In addition, the location of the collar and/or nozzles on the collar as shown represent preferred arrangements, but these may be modified to achieve the desired heat and noise reduction. The diameter of the nozzles may also be adjusted as desired. Finally, while liquid nitrogen is preferred, other liquid coolants, known in the art, may be employed to achieve the desired heat and noise reduction.

Figure 4:
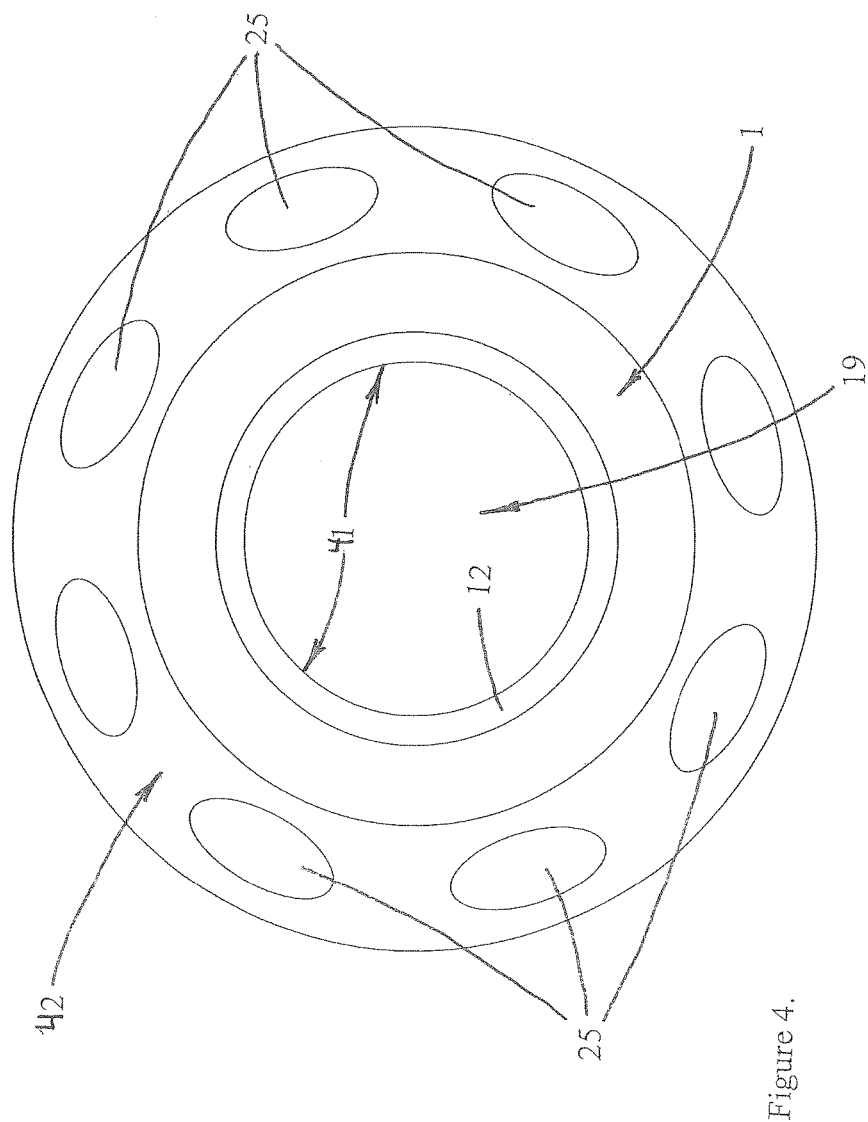
FIG. 4 is a line drawing of a front view of the features of an embodiment of the claimed invention.
Figure 5:
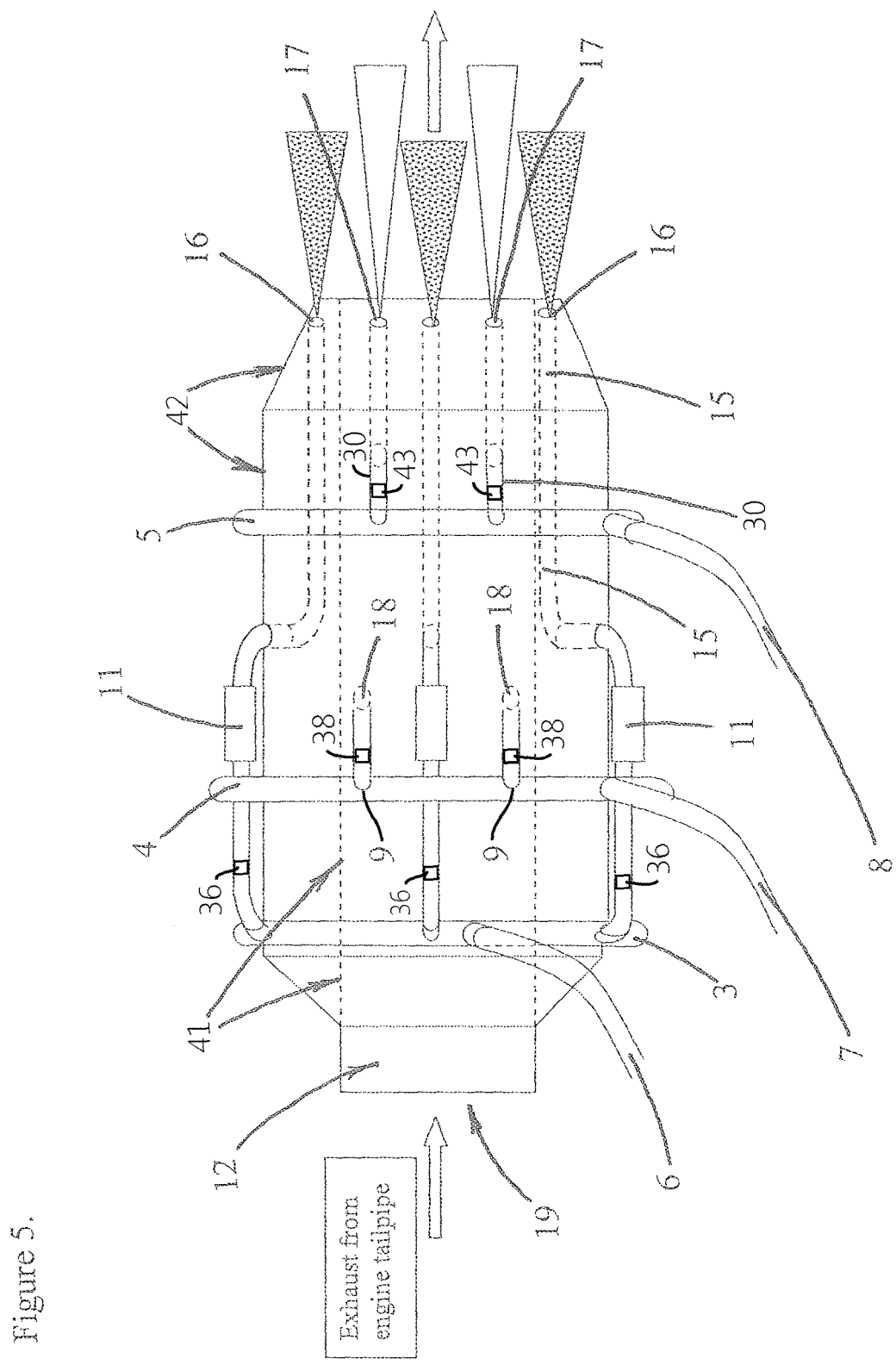
FIG. 5 is a line drawing of a side view of internal and external features of an embodiment of the claimed invention.
Figure 6:
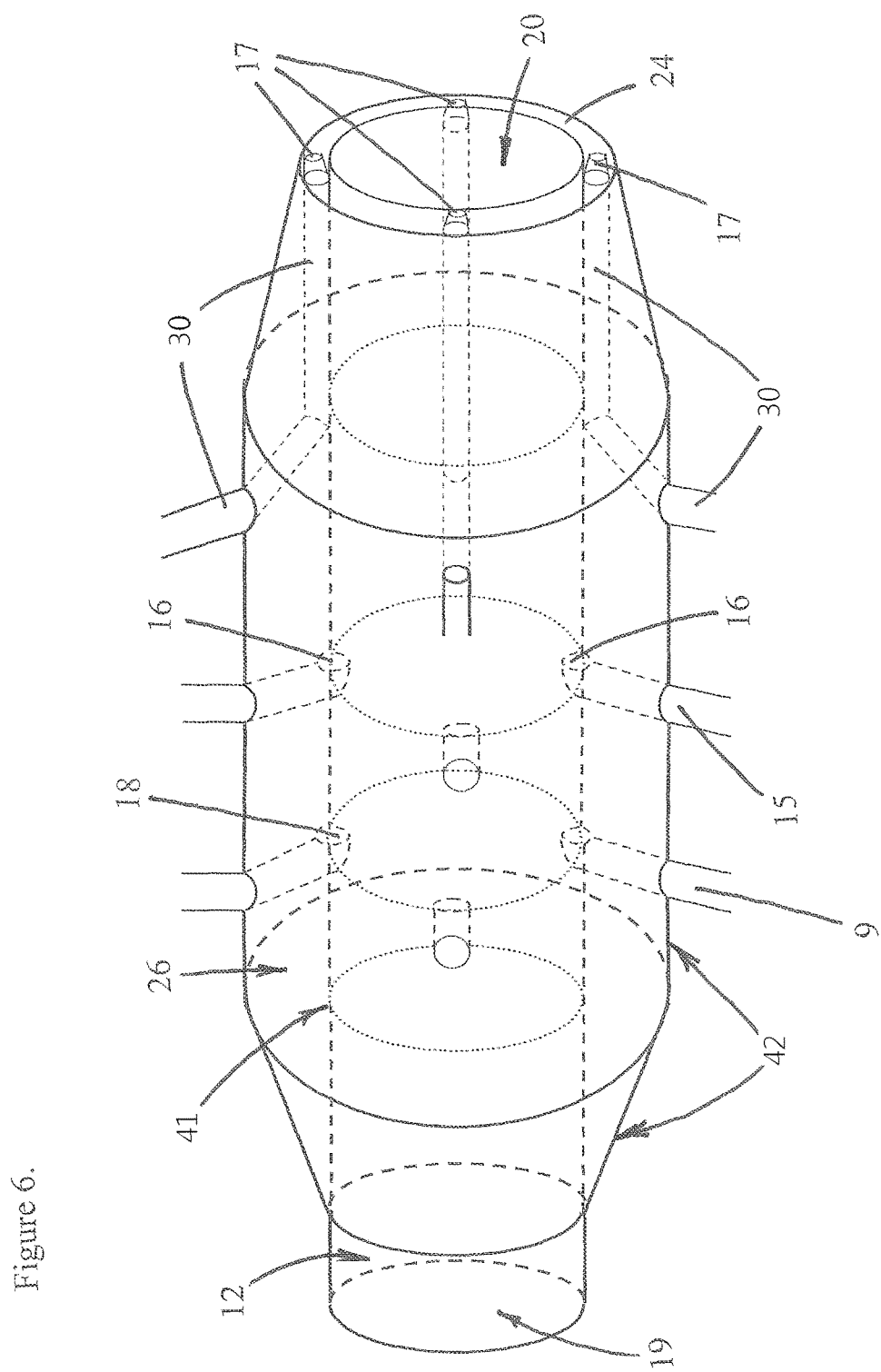
FIG. 6 is a line drawing of a side view of internal and external features of another embodiment of the claimed invention.

FIG. 4 illustrates an embodiment of the invention from the front showing the inlet opening 19, and the outer casing 42 having openings 25 for passage of cooler ambient air within the gap 26 between the inner 41 and outer 42 casings to form an air baffle. In other embodiments, the openings can be excluded to avoid creating turbulence and to create a dead air baffle in the gap between the inner and outer casings. The leading edge of the adapter section 12 is also seen from the front. In embodiments of the present invention, the adapter section 12 can expand from a first diameter configured and dimensioned to fit into or over a smaller exhaust pipe to a large diameter suitable of the inner casing 41 for the expansion and slowing down of the hot exhaust gases. FIG. 4 shows the front edge of the adapter section 12 having an inner surface of the inner casing 41, as well as the tapered outer surface of the inner casing 1 increasing to a larger diameter. FIGS. 4-6 also show the outlet or exhaust opening 20 of the device and the gap 26 between the inner and outer casing.

FIG. 5 depicts a side view of an embodiment of the invention showing internal features as hidden lines. The exhaust from an engine tailpipe is shown entering the inlet opening 19 of the adapter section 12. The dashed line is the inner casing 41, which maintains a relatively constant diameter along its entire length, as compared to FIGS. 2 and 4 which illustrate a smaller adapter section diameter flaring out to a larger inner casing diameter. In FIG. 5, the outer casing 42 is shown as flaring out at the front end and tapering down at the back end to match the diameter of the inner casing 41. The adapter section can be configured and dimensioned to fit within a tailpipe or around the tailpipe and be affixed by welding, brazing, or with mechanical fasteners. The air baffle is formed within the gap 26 between the inner casing 41 and the outer casing 42. The gap 26 can be between 1-5 inches, or more preferably between 2-4 inches.

FIG. 5 also shows three distribution collars 3,4,5 arranged along the length of the outer casing 42 and attached with suitable brackets or standoffs. In the illustrated embodiment, the first collar, located closest to the inlet opening 19 and adaptor 12, is for distribution of the combustion enhancing material, which is preferably an oxygen-supplying liquid. One end of feed line 6 is connected to the combustion-enhancing material distribution collar 3 using suitable fittings, welding, or brazing, while the other end of the feed line is connected to a supply of combustion enhancing material, which can be one or more reservoirs. The distribution collar 3 is in fluid communication with the combustion enhancing material reservoir(s) through the feed line 6.

The combustion-enhancing material distribution collar 3 provides combustion-enhancing material to one or more secondary feed lines 15, which penetrate the outer casing 42 and run parallel to the inner casing within the gap 26 between the inner 41 and outer 42 casings. The combustion-enhancing material may be provided from flexible feed line 6 which receives that material from tank 37 and pump 39. Alternatively, instead of pump 39, a first set of automated feed valves 36 may be provided, with one valve on each feed line 15. These valves 36 may be operated by any combination of computer(s). ASICs, electrical, and mechanical controls to deliver combustion-enhancing material when desired. Catalyst chamber 11 is connected to each of the one or more secondary feed lines 15 to catalytically decompose the combustion-enhancing material to form at least oxygen. The combustion-enhancing material is preferably an oxygen-generating liquid, including hydrogen peroxide or nitrous oxide in a liquid state, which can be decomposed using suitable catalysts known in the art. In other embodiments, other materials that provide oxygen, including liquid or compressed oxygen or ozone can also be used to supply oxygen to enhance combustion of the residual fuel and organic in the jet engine exhaust gases.

The decomposed combustion-enhancing material is feed through secondary feed lines 15 to the combustion-enhancing material injection ports or nozzles 16 to deliver the oxygen into the exhaust gases as they leave the inner casing 41. However, in other embodiments, the combustion-enhancing material can be injected into the exhaust gases within the inner casing 41, where the injection ports 16 can be positioned after the heat-reducing material injection ports or nozzles 18, so the heat-reducing material can cool and densify the hot gases before they interact with the injected oxygen, or the injection ports 16 can be positioned adjacent to the heat-reducing material injection ports or nozzles 18, so the heat-reducing material can cool and densify the hot oxygen as it is injected into the exhaust gas stream. The oxygen can be at high temperatures due to the release of energy during the catalytic decomposition.

The second collar 4 is located along the length of the outer casing 42 after the combustion enhancing material distribution collar and before the third collar, and attached with suitable brackets or standoffs. The second collar 4 is for distribution of the heat-reducing material, which is preferably anon-flammable cryogenic liquid. One end of feed line 7 is connected to the heat-reducing material distribution collar 4 using suitable fittings, welding, or brazing, while the other end of the feed line is connected to a supply of heat-reducing material, which can be one or more reservoirs 37. Cryogenic liquids can be stored in insulated dewars or cylinders to maintain the cryogenic temperatures and reduce boil-off of the material.

The heat-reducing material distribution collar 4 provides the heat-reducing material to one or more secondary feed lines 9, which penetrate the outer casing 42 and project into the inner casing 41 to inject the heat-reducing material into hot gases flowing through the inner space within inner casing 41. The heat-reducing material may be provided from flexible feed line 7 which receives that material from tank 33 and pump 35. Alternatively, instead of pump 35, a second set of automated feed valves 38 may b provided, with one valve on each feed line 9. These valves 38 may be operated by any combination of computer(s), ASICs, electrical, and mechanical controls to deliver combustion-enhancing material when desired. The heat-reducing material is injected into the inner cylindrical space through injection ports or nozzles 18 to absorb heat from the hot gases and reduce the gases velocity and temperature while increasing its density. Reducing the gas velocity and density serves to lower the noise level of the gas when it exits the exhaust opening 20.

The third collar 5 is located along the length of the outer casing 42 and attached with suitable brackets or standoffs. In the illustrated embodiment, the third collar 5 is located closest to the exhaust opening 20. The third collar is also a heat-reducing material distribution collar 5. One end of feed line 8 is connected to the heat-reducing material distribution collar 5 using suitable fittings, welding, or brazing, while the other end of the feed line is connected to a supply of heat-reducing material, which can be one or inure reservoirs 39. The heat-reducing material may be provided from flexible feed line 8 which receives that material from tank 33 and pump 35. Alternatively, instead of pump 35, a third set of automat d feed valves 43 may be provided, with one valve on each feed line 30. These valves 43 may be operated by any combination of computer(s). ASICs, electrical, and mechanical controls to deliver combustion-enhancing material when desired. This can be the same supply as used to feed heat-reducing material to distribution collar 4, or a separate set of reservoirs to provide added reliability and safety through redundancy.

In other embodiments of the invention, one or more fuel lines can be attached through injection ports to the confined space within the inner casing. In such an embodiment, the inner casing 41 acts as an after burner having a higher efficiency due to the simultaneous injection of the combustion enhancing material.

FIG. 6 illustrates an embodiment in which both the first set of heat-reducing material injection ports, and combustion-enhancing material injection ports are located within the inner casing 41. FIG. 6 shows the arrangement of feed lines 9, 15, 30 that pass through the outer casing of the heat attenuator body and lead to the injection ports and nozzles 16,17,18. Injection ports 16 and 18 penetrate the inner casing to the interior space, while feed lines 30 run parallel through the gap 26 between the inner and outer casings to nozzles 17 at the rear opening 24.

Figure 7:
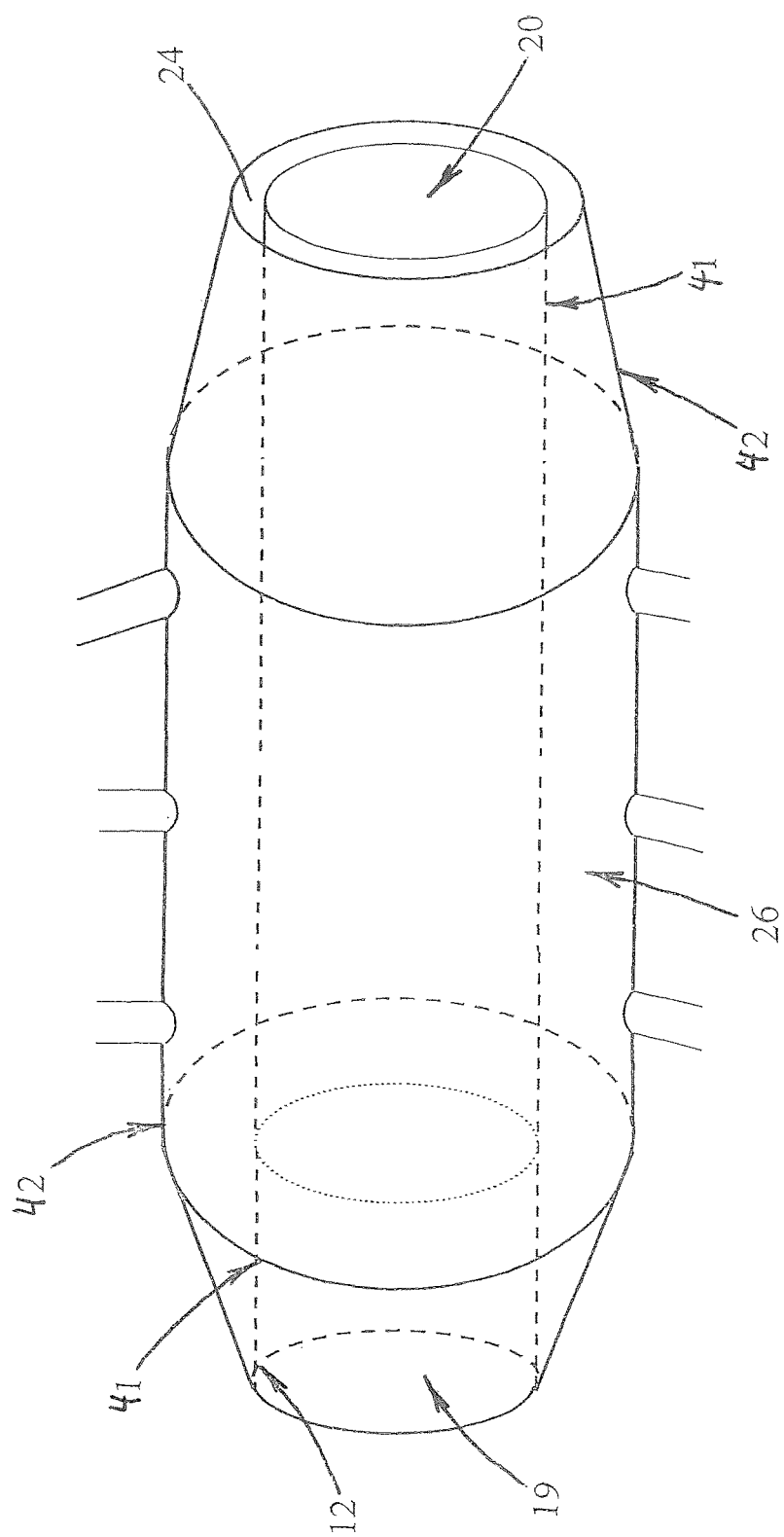
FIG. 7 is a line drawing of a side view of internal and external features of another embodiment of the claimed invention.
Figure 8A:
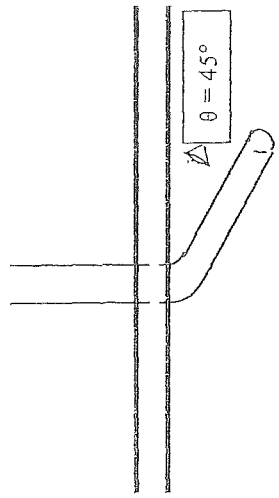
FIGS. 8A-8D are illustrations of the embodiments of different orientations for injection ports and nozzles inside a casing.
Figure 8B:
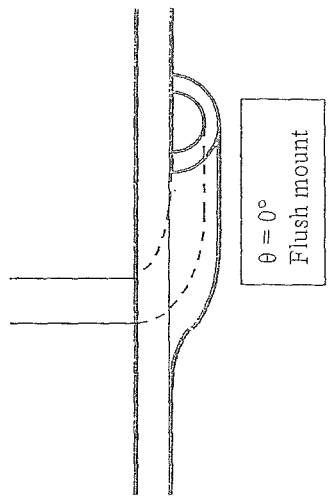
Figure 8C:
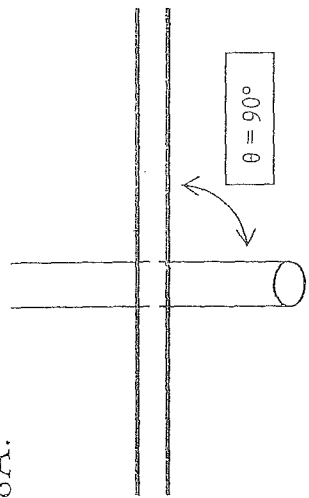
Figure 8D:
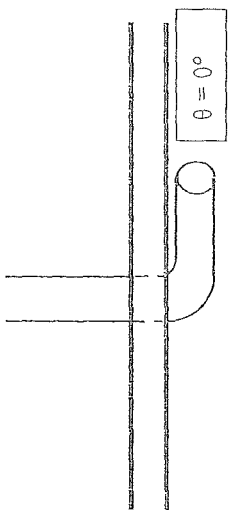

FIG. 7 illustrates another embodiment in which the adaptor section 12 is an integral part of the inner casing 41, having the same inner diameter, and configured to fit over an engine tailpipe. The inner casing has the same diameter from the inlet opening 19 to the exhaust opening 20. The inner casing 41 and inlet opening 20 is therefore configured and dimensioned to fit over an engine tailpipe as the adapter section 12. The outer casing 42 tapers down to the same diameter as the inner casing 41 at the front end, and has a larger diameter than the inner casing 41 at the back end to form an opening 24. The air baffle forms in the gap 26 between the inner and outer casings.

FIGS. 8A to 8D illustrates the different arrangements and orientations of the injection ports and nozzles penetrating the inner casing 41 to introducing the materials perpendicular to the exhaust gas flow ($\theta=90°$), parallel to the flow ($\theta=0°$), or any angle in between. An embedment also has an injection port formed flush with the surface of the inner casing to minimize the amount of turbulence introduced.

In one example, a 160 liter stainless steel cryogenic cylinder is used to hold liquid nitrogen as the heat reducing material. The liquid nitrogen is pumped through two ⅜" internal diameter feed lines 7,8 to a first distribution collar 4 having a ¾" internal diameter and a second distribution collar 5 having a ¾" internal diameter under pressure of the evaporated nitrogen in the cylinder. The first distribution collar 4 is attached approximately at the center of the outer casing. Feed lines 9 having a ⅜" internal diameter leaving the first distribution collar penetrate the outer casing 42, where the outer casing has an outer diameter of 12-¼", and are attached to openings in the inner casing 41, where the inner casing has an outer diameter of 8-¼". The liquid nitrogen is pumped through the feed lines 7,8 and collars 4,5 and injected into the inner casing 41 to absorb heat from the exhaust gases and lower the overall temperature of the mixed gases. The attachment flange 12 has a 5-¾" outer diameter.

A passivated aluminum cylinder is used to hold a 53% hydrogen peroxide solution at the combustion-enhancing material. The hydrogen peroxide is pumped through one ¼" internal diameter feed line 6 to a combustion-enhancing material distribution collar 3 which has a ½" internal diameter by pump 33 operating at between 30 and 50 psi. A set of four second feed lines leave the distribution collar 3 and is connected to catalyst chamber 11 before going to the inlets fixed to the outer casing 42. The catalyst is a 50 mesh silver wool or gauze. The hydrogen peroxide decomposes to water vapor and oxygen gas. The gas and liquid pass through the distribution collar 3 to four outlet feed lines. The outlet feed lines pass through the outer casing to the inner casing 41 and enter the inner space within the inner casing between the upstream 13 and downstream 30 liquid nitrogen injection ports.

FIG. 9 shows a table containing experimental results collected from three tests of an embodiment of the invention. The tests examined the effects of introducing liquid nitrogen into a jet engine exhaust on the drop in temperature of the exhaust plume. A temperature monitoring device was mounted on a steel rod placed approximately 18 inches from the exhaust outlet of the jet engine, and the temperature measurements at the rod were compared with and without the introduction of the cryogenic liquid into the engine exhaust. Column A of the table shows the ambient temperature of the air at the time of the testing as a reference for the engine temperature and exhaust temperatures. The surrounding temperature remained at 67-68° F. during the testing. Column B shows the temperature of the engine itself, which had a temperature of 530° F. during the test. Column C shows the temperature measured at the steel rod placed 18 inches from the exhaust outlet of the engine under different conditions as described in columns E-K. The first entry in column C shows the resulting temperature of 267° F. for a control run without introducing any cryogenic liquid. This temperature was used as a reference point for the three subsequent test runs. Column D shows the percentage change in measured temperature resulting from the introduction of liquid nitrogen through nozzles positioned inside of the housing and/or outside of the housing in the exhaust plume.

Columns E-K describe particular characteristics for each of the three test runs, including: the pressure in the liquid nitrogen reservoir and the force that the liquid nitrogen was forced through the conduits, distribution manifold, and nozzles. Column F indicates whether the liquid nitrogen was flowing from the reservoir, whereas columns G and H indicate whether the liquid nitrogen was being injected into the device from nozzles directed internally into the exhaust gassed within the heat attenuator and/or nozzles directed externally into the exhaust plume behind the attenuator. Column I indicates the distance of the measuring device and mounting rod from the attenuator's exhaust outlet. Column J further indicates additional aspects of the test run not otherwise indicate in the table.

The results of tests 1, 2, and 3 show that the introduction of liquid nitrogen as the cryogenic liquid produces a 20% to 43% reduction in temperature of the exhaust gasses that have exited the heat attenuator compared to the reference temperature of 267° F. Test 1 shows the resulting decrease in temperature from 267° F. to 214° F. using only the four nozzles injecting the liquid nitrogen inside the attenuator. Test 2 shows the resulting decrease in exhaust gas temperature using three internal nozzles and three nozzles injecting liquid nitrogen into the exhaust gasses that have already exited the body of the attenuator. Test 2 shows an improvement over the results produced by test 1. Test 3 shows the resulting decrease in temperature from 267° F. to 151° F. using only the four nozzles injecting the liquid nitrogen into the exhaust gasses that have already exited the body of the attenuator. Test 3 used swirl nozzles which provides increased coverage of the jet plume volume, As can bee seen from the test results, introduction of a suitable amount of a cryogenic liquid into the exhaust of a jet engine produces a significant decrease in the temperature. Reducing the heat profile of the jet exhaust can make lock-on by heat-seeking missiles more difficult, reduce the amount of time the aircraft is a viable target, and increase the effectiveness of flares and other counter measures.

FIG. 10 shows a table containing additional experimental results collected from two additional test runs of an embodiment of the invention. Column A of the table shows the ambient temperature of the air at the time of the testing as a reference for the engine temperature and exhaust temperatures. The surrounding temperature remained at 77-78° F. during the testing, Column B shows the temperature of the engine itself, which had a temperature of 530° F. during the test running at 102.5% of the jet engines rated rotations per minute (RPM). The first entry in column C shows the resulting temperature of 290° F. at the beginning of the test run without introducing any cryogenic liquid. Column E indicates the pressure measured at the cryogenic reservoir, which was greater than the pressures utilized in tests 1-3. Test 4 shows the resulting decrease in temperature from 290° F. to 74° F. using only the four cone nozzles injecting the liquid nitrogen into the exhaust plume outside the attenuator, A drop from 290° F. to 74° F. provides at least a 75% or 3-fold improvement in temperature reduction. This reduced the temperature of the jet exhaust from an initial value of 290° F. to approximately the ambient temperature of the air surrounding the jet engine, which would cause the exhaust plume to be indistinguishable from the surrounding air.

Test 5 shows the resulting decrease in exhaust gas temperature using four outside cone nozzles injecting liquid nitrogen into the exhaust gasses that have already exited the body of the attenuator. Test 5 shows an improvement over the results produced by test 4, which may have resulted from faster delivery of liquid nitrogen to the nozzles without an initial flow of nitrogen gas. The resulting injection of the cryogenic liquid into the exhaust plume for test 5 reduced the measured temperature of the exhaust gas profile at 18 inches from the exhaust outlet to at least an ambient temperature. The introduction of the heat reduction material thereby resulted in a temperature reduction of the exhaust gas from 290° F. to 51° F., which was 27° F. (or 36%) below the measured ambient temperature of 78° F. This is an 82% decrease in outlet temperature at the measured point and the thermal signature, that reduces the exhaust gas temperature to significantly below the background temperature, which would make the thermal signal undetectable by infra-red tracking missiles. A drop from 290° F. to 51° F. provides at least a 5-fold improvement in temperature reduction. By introducing the liquid nitrogen at the same time as oxygen, a jet engine can produced greater thrust with a lower temperature heat profile.

One or more features illustratively described herein can be implemented individually or in various combinations, The terms and expressions which have been employed in the specification are used as terms of description and not of limitations. There is no intention in the use of such terms and expressions to exclude any equivalents of the features shown and described or portions thereof, but it is recognized that various rearrangements and modifications are possible within the scope of the claims to the invention set forth below.

What is claimed is:

1. A system for increasing thrust and fuel efficiency and reducing thermal signature of a jet engine, comprising: an exhaust gas heat attenuator; a first reservoir containing therein a heat reduction material comprising liquid nitrogen, liquid carbon dioxide or liquid argon as a non-flammable cryogenic liquid, wherein the first reservoir is operatively associated and in fluid communication with the exhaust gas heat attenuator; a first set of one or more injection ports configured and dimensioned to introduce the non-flammable cryogenic liquid from the first reservoir into the exhaust gas heat attenuator; and a second reservoir containing combustion enhancing material comprising hydrogen peroxide, ozone, or nitrous oxide as an oxygen supplying liquid, wherein the second reservoir is separate from the first reservoir and is operatively associated and in fluid communication with the exhaust gas heat attenuator; a second set of one or more injection ports configured and dimensioned to introduce the combustion enhancing material into exhaust gases in the exhaust gas heat attenuator from the second reservoir; and a controller that controls the introduction of the non-flammable cryogenic liquid from the first reservoir and the combustion enhancing material from the second reservoir to the exhaust gas heat attenuator, wherein the controller can initiate release of either the non-flammable cryogenic liquid, the combustion enhancing material, or both into the exhaust gas heat attenuator; wherein the first set of one or more injection ports is located downstream of the second set of one or more injection ports so that the introduced non-flammable cryogenic material cools and increases a density of the exhaust gases to reduce jet engine heat and noise levels.

2. The system of claim 1, wherein the exhaust gas heat attenuator is a separate unit and further comprises:
an adapter section suitably sized and dimensioned for attachment to a tailpipe of the jet engine;
an inner casing suitably sized and dimensioned for containing the exhaust gases from the jet engine, wherein the inner casing is attached to the adapter section at a first end and has an opening to allow the exhaust gases to exit the inner casing to atmosphere.

3. The system of claim 2, wherein the heat attenuator further comprises an outer casing attached to the inner casing, wherein the outer casing is suitably sized and dimensioned to fit around the inner casing to form a gap between the inner and outer casing that shields the inner casing from an external environment.

4. The system of claim 3, wherein the outer casing is attached to the first end of the inner casing by a tapered section.

5. The system of claim 1, wherein the system further comprises: a first distribution manifold, wherein the first distribution manifold is connected to and in fluid communication with the first reservoir at a first end and the first set of one or more injection ports and the exhaust gas heat attenuator at a second end; and a second distribution manifold, wherein the second distribution manifold is connected to and in fluid communication with the second reservoir at a first end and the second set of one or more injection ports and the exhaust gas heat attenuator at a second end.

6. The system of claim 5, which further comprises a third distribution manifold, wherein the third distribution manifold is connected to and in fluid communication with the reservoir at a first end and the exhaust gas heat attenuator at a second end.

7. The system of claim 6, wherein the controller initiates introduction of the non-flammable cryogenic liquid to the exhaust gas heat attenuator through the first manifold and the third manifold without the introduction of the combustion-enhancing material to the exhaust gas heat attenuator to maximize amount of heat reduction.

8. The system of claim 1, wherein the controller initiates introduction of the non-flammable cryogenic liquid simultaneously with introduction of the combustion-enhancing material to the exhaust gas heat attenuator when the controller recognizes a triggering event.

9. The apparatus of claim 8, wherein the triggering event is take-off, activation of full throttle, or evasive maneuvers.

10. The apparatus of claim 1 wherein the non-flammable cryogenic liquid in the first reservoir is liquid nitrogen and the combustion-enhancing material in the second reservoir is hydrogen peroxide.

11. The apparatus of claim 1, wherein the controller controls the release of the non-flammable cryogenic liquid independently from the release of combustion-enhancing material.

12. The apparatus of claim 1, wherein the controller controls the release of the non-flammable cryogenic liquid and combustion-enhancing material simultaneously.

13. The system of claim 1, further comprising: a first set of automated valves operatively associated with and in fluid communication with the first set of one or more injection ports, wherein the automated valves are in electrical communication with the controller to receive an electronic signal to introduce the non-flammable cryogenic liquid into the exhaust gas heat attenuator; and a second set of automated valves operatively associated with and in fluid communication with the second set of one or more injection ports, wherein the automated valves are in electrical communication with the controller to receive an electronic signal to introduce the combustion enhancing material into the exhaust gas heat attenuator; wherein the controller can activate and deactivate the first set of automated valves and the second set of automated valves independently.

14. The system of claim 13, further comprising: an outer shell comprising a shell wall, wherein the outer shell is positioned around the exhaust gas heat attenuator and separated a distance from the exhaust gas heat attenuator to create an air baffle that insulates the exhaust gas heat attenuator from the shell so that the shell wall is at a lower temperature than the exhaust gas heat attenuator.

15. The system of claim 13, further comprising: a third set of one or more injections ports arranged around the outlet of the exhaust gas heat attenuator, wherein the third set of one or more injection ports are configured and dimensioned to introduce the non-flammable cryogenic liquid into the exhaust gas heat attenuator, and wherein the third set of one or more injection ports is located even with or downstream of the second set of one or more injection ports; and a third set of automated valves operatively associated with and in fluid communication with the third set of one or more injection ports, wherein the third set of automated valves are in electrical communication with the controller to receive an electronic signal to introduce the non-flammable cryogenic liquid into the exhaust gas heat attenuator, and wherein the second set of one or more injection ports and the third set of one or more injection ports can be activated at approximately the same time so the introduction of the non-flammable cryogenic liquid into the exhaust gases compensates for a temperature increase caused by the introduction of the combustion enhancing material.

16. The system of claim 15, further comprising: nozzles attached to the first set of one or more injection ports, and/or the second set of one or more injection ports, and/or the third set of one or more injection ports, wherein the nozzles generate a particular spray pattern.

\* \* \* \* \*